United States Patent [19]

Dean et al.

[11] Patent Number: 4,624,840

[45] Date of Patent: * Nov. 25, 1986

[54] NON-CATALYTIC METHOD FOR REDUCING THE CONCENTRATION OF NO IN COMBUSTION EFFLUENTS BY INJECTION OF AMMONIA AT TEMPERATURES GREATER THAN ABOUT 1300° K.

[75] Inventors: Anthony M. Dean, Hampton; Anthony J. DeGregoria, Flemington; James E. Hardy, Lebanon; Boyd E. Hurst, Long Valley; Richard K. Lyon, Pittstown, all of N.J.

[73] Assignee: Exxon Research & Engineering Company, Florham Park, N.J.

[ * ] Notice: The portion of the term of this patent subsequent to Mar. 26, 2002 has been disclaimed.

[21] Appl. No.: 714,965

[22] Filed: Mar. 22, 1985

Related U.S. Application Data

[63] Continuation-in-part of Ser. No. 550,398, Nov. 10, 1983, Pat. No. 4,507,269.

[51] Int. Cl.$^4$ .......................... C01B 21/00; B01J 8/00
[52] U.S. Cl. ..................................... 423/235; 423/239
[58] Field of Search .................. 423/235, 235 D, 239, 423/239 A

[56] References Cited

U.S. PATENT DOCUMENTS

| | | | |
|---|---|---|---|
| 3,681,659 | 8/1972 | Shaw et al. | 75/134 F |
| 3,900,554 | 8/1975 | Lyon | 423/235 |
| 4,104,294 | 8/1978 | Grose et al. | 260/448 |
| 4,129,651 | 12/1978 | Koike et al. | 423/235 |
| 4,507,269 | 3/1985 | Dean et al. | 423/235 |

FOREIGN PATENT DOCUMENTS

| | | | |
|---|---|---|---|
| 2657617 | 9/1977 | Fed. Rep. of Germany | 423/235 D |
| 2803876 | 3/1978 | Fed. Rep. of Germany | 423/235 D |
| 53-63625 | 6/1978 | Japan | 423/235 |

OTHER PUBLICATIONS

S. Salimian et al., A Kinetic Study of NO Removal from Combustion Gases by Injection of $HN_1$-Containing Compounds, Combustion Science and Technology, vol. 23, pp. 225-230, (1980).

James A. Miller et al., A Chemical Kinetic Model for the Selective Reduction of Nitric Oxide by Ammonia, Combustion and Flame 43:81-98, (1981).

Joel A. Silver, A Chemical Model for the Reduction of Nitric Oxide by Ammonia in Post Combustion Flows, Journal of Physical Chemistry.

Primary Examiner—Gregory A. Heller
Attorney, Agent, or Firm—Henry E. Naylor

[57] ABSTRACT

Disclosed is a process for non-catalytically removing NO from combustion effluent streams at temperatures from about 1300° K. to 1600° K. by injecting ammonia into a combustion effluent stream at a point where the stream is cooling at a rate of at least about 250° K./sec, wherein the amount of ammonia injected and its point of injection are determined by the solution of a set of simultaneous equations derived from the kinetic model of Table I hereof.

9 Claims, 1 Drawing Figure

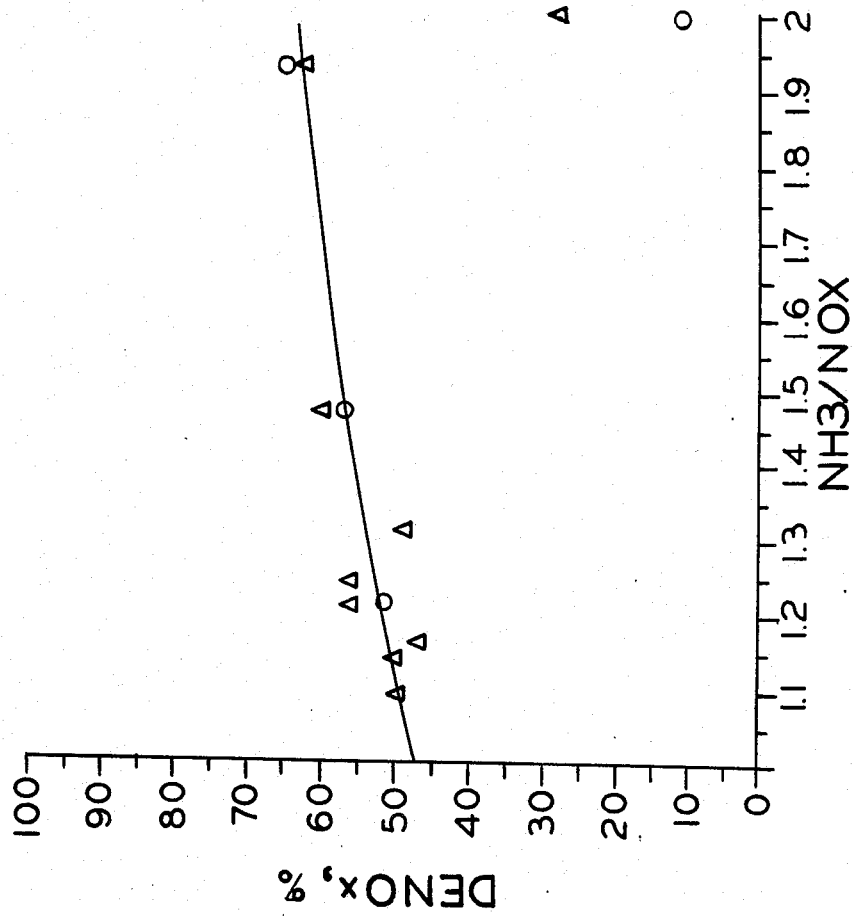

NON-CATALYTIC METHOD FOR REDUCING THE CONCENTRATION OF NO IN COMBUSTION EFFLUENTS BY INJECTION OF AMMONIA AT TEMPERATURES GREATER THAN ABOUT 1300° K.

CROSS REFERENCE TO RELATED APPLICATIONS

This is a continuation-in-part of U.S. Ser. No. 550,398, filed Nov. 10, 1983, now U.S. Pat. No. 4,507,269.

FIELD OF THE INVENTION

The present invention relates to a non-catalytic method for reducing the concentration of NO in combustion effluents by the injection of ammonia. More particularly, the invention relates to the injection of ammonia into a nonisothermal zone of post combustion apparatus where the combustion effluent is at a temperature of about 1300° K. to about 1600° K. and wherein the amount of ammonia and its point of injection are determined by the solution of the set of simultaneous equations derived from the kinetic model hereof.

BACKGROUND OF THE INVENTION

Combustion effluents and waste products from various installations are a major source of air pollution when discharged into the atmosphere. One particularly troublesome pollutant found in many combustion effluent streams is $NO_2$, a major irritant in smog. Furthermore, it is believed that $NO_2$ undergoes a series of reactions known as photo-chemical smog formation, in the presence of sunlight and hydrocarbons. The major source of $NO_2$ is NO which to a large degree is generated at such stationary installations as gas and oil-fired steam boilers for electric power plants, process heaters, incinerators, coal fired utility boilers, glass furnaces, cement kilns, oil field steam generators.

Various methods have been developed for reducing the concentration of nitrogen oxides in combustion effluents. One such method which was developed was a non-catalytic thermal $deNO_x$ method disclosed in U.S. Pat. No. 3,900,554 to Lyon which patent is incorporated herein by reference. The process disclosed in that patent teaches the reduction of NO to $N_2$ by injecting ammonia into the combustion effluent stream at a temperature from about 975° K. to about 1375° K. in a cavity which is substantially isothermal. That is, where the temperature of the gases passing through the cavity are cooling at a rate of less than about 50° C./sec. Since the issuance of U.S. Pat. No. 3,900,554, there has been a proliferation of patents and publications relating to the injection of ammonia into combustion effluent streams for reducing the concentration of NO. It is the general consensus of the literature that ammonia injection at temperatures greater than about 1375° K. would result in the generation of NO from ammonia and consequently conventional selective non-catalytic $NO_x$ reduction processes are practiced by injecting ammonia at temperatures lower than about 1375° K. Because of this temperature limitation, it is difficult and sometimes not possible to apply conventional non-catalytic $NO_x$ reduction processes. This is because during the operating cycle of some boilers and heaters, the temperature range required by conventional processes corresponds to positions in the boiler or heater where it is mechanically inconvenient to inject ammonia. In at least some of these instances, this inconvenience could be overcome if the combustion effluent could be contacted with ammonia at temperatures above about 1375° K. and still obtain satisfactory reductions in the concentration of NO. Furthermore, at temperatures between about 1300° K. and 1375° K. prior art methods were not always adequate to reduce the NO content of combustion effluent streams to environmentally desirable levels whereas the present invention provides such a method.

In addition, conventional non-catalytic thermal $deNO_x$ processes are further limited in that they teach the injection of ammonia into a constant temperature, or isothermal zone. This is limiting because in a conventional boiler or heater, operating at constant load, combustion effluents typically leave the burner flames at temperatures greater than about 1875° K. As they travel through the boiler or heater they cool in stages—not continually. This staged cooling occurs because of the manner of heat removal from the combustion effluents. Heat is usually removed by heat transfer tubes which are arranged in banks with substantial cavities between the banks. Consequently, combustion effluents are rapidly cooled while they flow through a tube bank, undergo very little cooling as they pass through a cavity, rapidly cool again while passing through another tube bank, etc. U.S. Pat. No. 4,115,515 to Tenner et al, also incorporated herein by reference, teaches that the injection apparatus should be installed in a cavity in such a manner that the ammonia contacts the combustion effluent stream as the effluents come into the cavity. Such a process has the effect that the reaction time, that is the time at constant temperature during which ammonia could reduce $NO_x$, is the total time the combustion effluents spend passing through a cavity. Unfortunately, in some boilers and heaters, this reaction time—though adequate to provide a useful $NO_x$ reduction—is not sufficient to provide as great a reduction in $NO_x$ concentration as may be environmentally desirable.

Therefore, there is still a need in the art for methods of practicing non-catalytic $deNO_x$ reduction processes which will overcome, or substantially decrease, the limitations of conventional practices.

SUMMARY OF THE INVENTION

In accordance with the present invention there is provided a process for noncatalytically reducing the concentration of NO in combustion effluents containing NO and at least 0.1 volume percent oxygen, at temperatures from about 1300° K. to 1600° K. by injecting ammonia into the combustion effluent in a cooling zone wherein the combustion effluent is cooling at a rate of at least about 250° K. per second. The amount of ammonia and the point of its injection is determined by the solution of a set of simultaneous equations derived from the kinetic model of Table I hereof.

In one preferred embodiment of the present invention ammonia is injected at a point upstream from a cooling zone and in such an amount so that when the combustion effluent reaches the cooling zone it contains from about 0.4 to 10 moles of ammonia per mole of NO.

BRIEF DESCRIPTION OF THE FIGURES

The sole FIGURE hereof shows actual performance data versus predicted performance data generated by use of the kinetic model disclosed herein, for a 235 megawatt utility boiler.

DETAILED DESCRIPTION OF THE INVENTION

As is well-known, combustion is effected in stationary combustion equipment such as boilers, furnaces and incinerators in a section of the equipment commonly referred to as a firebox. Generally, this is accomplished by igniting a suitable fuel, in the presence of air, with one or more burners. Materials other than conventional fuels can, however, be combusted in the firebox portions of the equipment which is generally the case when combustion is effected in an incinerator. In any event, the principal combustion products are carbon dioxide and steam and those products, along with the other combustion products such as carbon monoxide and the various oxides of nitrogen and sulfur, combined with any excess oxygen and unconverted nitrogen to form what is referred to herein as a combustion effluent. The combustion effluent will also contain about 0.1 to 15 volume percent oxygen, preferably about 1 to 3 volume percent.

The temperature of the combustion effluent is, then, a maximum at or near the point of combustion and decreases axially (along the flow path) and radially (outwardly) as the effluent moves along its flow path from the point of combustion until it is, ultimately, emitted to the atmosphere or otherwise loses its identity as a combustion effluent. As previously mentioned, the combustion effluents, as they travel through the combustion apparatus cool in stages. That is, rapid cooling will occur when the combustion effluent is in contact with heat exchange equipment, such as heat transfer tubes. The prior art teaches that $NO_x$ reduction was only possible in the cavities between the cooling zones as opposed to in the cooling zones themselves. By practice of the present invention non-catalytic $deNO_x$ can now be achieved at high temperatures in or immediately before a cooling zone.

The amount of ammonia used herein ranges from about 0.5 to 10 moles, preferably 1 to 3 moles of ammonia per mole of NO to be removed.

The reaction may be carried out at pressures from about 0.1 atmospheres to 100 atmospheres. The velocities of the combustion effluents as well as the mixing of the ammonia in the post-combustion zone are regulated so that there is an effective residence time, in a temperature range of 1300° K. to 1600° K., to enable the ammonia to remove $NO_x$ from the combustion effluent stream. The residence time will range from about 0.001 to 10 seconds.

Although at temperatures above about 1375° K. conventional non-catalytic $deNO_x$ processes are generally inoperative, the inventors hereof have identified a critical set of conditions whereby non-catalytic $deNO_x$ may now be practiced on a wider variety of combustion installations than heretofore thought possible. Furthermore, the practice of the present invention enables a more effective non-catalytic $deNO_x$ operation at temperatures above about 1300° K.

Because it is difficult to accurately simulate, on a laboratory scale, the temperature time history of combustion effluents as they pass through a tube bank in a boiler/heater, it is necessary to generate examples by means other than laboratory experiments. Complex chemical reactions occur by a series of elementary reaction steps and if one knows the rate constants for such steps, a theoretical kinetic mechanism can be developed and verified through comparison with experimental data. An extensive block of kinetic data was developed herein by use of apparatus similar to the apparatus taught in U.S. Pat. No. 3,900,554 and used to determine which elementary reactions would likely be of significance during the reduction of NO by $NH_3$. For many of the reactions, the rate constants were well-known accurately measured constants of nature whereas for the remaining reactions the rate constants were not accurately known and accordingly were taken as adjustable parameters. That is, values for the unknown rate constants were assumed, the reaction kinetics to be expected from these rate constants were calculated and compared with the observed kinetics. Based on this comparison a new set of rate constants was assumed, etc., until satisfactory agreement between calculation and experimentation were finally obtained. As a result, the kinetic model hereof and respective rate constants were developed by the inventors hereof for accurately predicting the conditions for the practice of the present invention.

In the practice of the present invention the effluent stream to be treated is measured to determine the content of NO, $O_2$, and $H_2O$. These initial conditions, as well as cooling rate measurements of appropriate cooling zones having a high temperature in the range of about 1300° K. and 1600° K. are used in conjunction with the kinetic model hereof with appropriate software to determine the amount of ammonia and an injection point which will give NO reduction. Appropriate software suitable for use herein would be any computer program designed for numerical integration of chemical rate expressions. A non-limiting example of such software is CHEMKIN; A General-Purpose, Problem-Independent, Transportable, Fortran Chemical Kinetics Code Package; R. J. Kee, J. A. Miller, and T. H. Jefferson, an unlimited released Sandia National Laboratory Report SAND80-8003 (1980). This report is also available through the National Technical Information Service, U.S. Department of Commerce.

The following example is offered, not as an illustration of the subject invention but to demonstrate the validity of the kinetic model employed herein. The model was used to calculate the NO reduction to be expected for a 235 megawatt utility boiler of the following characteristics:

Flue Gas Flow Rate: 2,000,000 lb/hr at 3–4% $O_2$ dry
Flue Gas Temperature: 880°–1040° C.
NO Conc.: 190–220 ppm at 3–4% $O_2$ dry The FIGURE (diamonds) contains actual performance data on the above boiler at full load with a best fit curve through the data. The circles in the FIGURE represent paper data generated by use of the kinetic model hereof. The FIGURE illustrates the surprisingly good agreement of model data vs. actual data.

The good agreement between predicted and observed NO reduction illustrates that the kinetic model is reliable for calculating NO reduction.

The advantages of the kinetic computer model hereof are substantial in that it permits one skilled in the art to readily determine, by calculation, the embodiment of the present invention which will yield optimum results for his particular circumstances. In general, however, it may be said that the present invention is an improved method of noncatalytic reduction of NO with $NH_3$, the improvement of the present invention relating to the temperature at which the $NH_3$ is contacted with the NO containing combustion effluents. This contacting is done at temperatures from about 1300° K. to about 1600° K. at a point where the combustion effluents are cooling at a rate of at least 250° K./sec or at a point where enough ammonia is still present such that the volume ratio of ammonia to $NO_x$ is in the range of about 0.4 to 10 when it enters a cooling zone having a cooling rate of at least about 250° K./sec. Generally, the ammonia can be injected up to 0.04 seconds upstream from a cooling zone, preferably 0.02 seconds, and more preferably 0.01 seconds. The higher portion of the 1300° K. to 1600° K. temperature range relates to higher initial NO concentrations, lower $O_2$ content of the combustion effluents, higher cooling rates and shorter delay times prior to cooling. To a somewhat lesser degree, the upper portion of the temperature range is also associated with higher $H_2O$ content.

TABLE I

KINETIC MODEL
Rate constant $K = AT^n \exp(-E/(1.98)T)$

| | REACTION | A | n | E |
|---|---|---|---|---|
| 1. | $NH_3+O=NH_2+H_2$ | .246E+14 | 0.0 | 17071. |
| 2. | $NH_3+O=NH_2+OH$ | .150E+13 | 0.0 | 6040. |
| 3. | $NH_3+OH=NH_2+H_2O$ | .326E+13 | 0.0 | 2120. |
| 4. | $HNO+M=NO+H+M$ | .186E+17 | 0.0 | 48680. |
| 5. | $HNO+OH=NO+H_2O$ | .360E+14 | 0.0 | 0. |
| 6. | $NH_2+HNO=NH_3+NO$ | .175E+15 | 0.0 | 1000. |
| 7. | $NH_2+NO=NNH+OH$ | .610E+20 | −2.46 | 1866. |
| 8. | $NH_2+O_2=HNO+OH$ | .510E+14 | 0.0 | 30000. |
| 9. | $NNH+NH_2=N_2+NH_3$ | .100E+14 | 0.0 | 0. |
| 10. | $NH_2+O=NH+OH$ | .170E+14 | 0.0 | 1000. |
| 11. | $NH_2+OH=NH+H_2O$ | .549E+11 | 0.68 | 1290. |
| 12. | $NH_2+H=NH+H_2$ | .500E+12 | 0.5 | 2000. |
| 13. | $NH+O_2=NHO+O$ | .300E+14 | 0.0 | 3400. |
| 14. | $H_2+OH=H_2O+H$ | .220E+14 | 0.0 | 5150. |
| 15. | $H+O_2=OH+O$ | .220E+15 | 0.0 | 16800. |
| 16. | $O+H_2=OH+H$ | .180E+11 | 1.0 | 8900. |
| 17. | $H+HO_2=OH+OH$ | .250E+15 | 0.0 | 1900. |
| 18. | $O+HO_2=O_2+OH$ | .480E+15 | 0.0 | 1000. |
| 19. | $OH+HO_2=H_2O+O_2$ | .500E+14 | 0.0 | 1000. |
| 20. | $OH+OH=O+H_2O$ | .630E+13 | 0.0 | 1090. |
| 21. | $HO_2+NO=NO_2+OH$ | .343E+13 | 0.0 | −260. |
| 22. | $H+NO_2=NO+OH$ | .350E+15 | 0.0 | 1500. |
| 23. | $O+NO_2=NO+O_2$ | .100E+14 | 0.0 | 600. |
| 24. | $H+O_2+M=HO_2+M$ $H_2O/21**$ | .150E+16 | 0.0 | −995. |
| 25. | $NNH+M=N_2+H+M$ | .200E+15 | 0.0 | 30000. |
| 26. | $NO_2+M=NO+O+M$ | .110E+17 | 0.0 | 66000. |
| 27. | $NH_3+M=NH_2+H+M$ | .480E+17 | 0.0 | 93929. |
| 28. | $O+O+M=O_2+M$ | .138E+19 | −1.0 | 340. |
| 29. | $NH_2+NO=N_2+H_2O$ | .910E+20 | −2.46 | 1866. |
| 30. | $NNH+OH=N_2+H_2O$ | .300E+14 | 0.0 | 0. |
| 31. | $NNH+NO=N_2+HNO$ | .906E+12 | 0.0 | 0. |

**i.e. $A = 21 \times .15E+16$ for $H_2O$ as "third body".

Given this model, one having ordinary skill in the art can identify a corresponding set of simultaneous equations for solution.

A utility boiler is assumed with the following operating conditions, which operating conditions can be considered normal for such boilers: An excess air level of 19% of stoichiometric air while firing a fuel oil of H to C mol ratio of 1.4. The boiler thus produces a flue gas containing 3.1% $O_2$, 12.3% CO, 10.6% $H_2O$ and 74% $N_2$. There will also be traces of NO, the exact amount depending on the fuel's nitrogen content and the manner in which the fuel is burned. For this example the NO level will be assumed to be 250 vppm. Further, it is assumed there will be a trace of the free radicals OH and O, the exact concentrations of these being determined by thermodynamic equilibrium and therefore being a function of temperature.

Combustion flue gas would exit the burners at a very high temperature and cool as it passes through the rest of the boiler. Typically, boilers have a radiative section, a large empty section through which the flue gas passes, cooling by radiation as it travels, and a convection section, a section filled with banks of heat exchange tubes, the flue gas cooling by convection as it passes through these tube banks. As mentioned above, there are usually cavities between the banks of tubes. For purposes of this example let us assume that the boiler has one cavity between tube banks wherein the temperature is approximately constant and within the 1000° K. to 1500° K. range, the residence time of the flue gas within this cavity being 0.1 seconds.

Now to illustrate the limitations of the prior art we will consider the application of the prior art teaching to the above case. According to the prior art (U.S. Pat. No. 3,900,554 and 4,115,515) one would inject $NH_3$ as the flue gas enters the cavity. We will assume that the amount of $NH_3$ injection is 375 ppm which is well within the ranges taught by the prior art. Thus one has 0.1 seconds reaction time in the cavity for the $NH_3$ to reduce the NO.

Table II below shows for cavity temperatures from 1000° K. to 1500° K. the amounts of NO and $NH_3$ calculated by the computer model to remain after 0.1 seconds reaction time. The prior art teaches that at temperatures substantially below about 1145° K. the reduction of NO by $NH_3$ is so slow as to be inoperable, the calculations (using the kinetic model hereof) agree with this teaching. The prior art also teaches that increasing the temperature increases the rate of reaction but decreases the selectivity because a greater proportion of the $NH_3$ tends to oxidize to form additional NO rather than to reduce the NO, with the result that, while NO reduction is an operable process at temperatures in the 1145° K. to 1365° K. temperature range, it is not operable at temperatures substantially above 1365° K. Indeed, for such excessive temperatures the injection of the $NH_3$ by prior art processes may cause a net increase in NO. The calculated results in Table II, especially the result of 1500° K. are entirely consistent with such teachings.

TABLE II

Comparative Examples of NO Reduction at Isothermal Conditions

| Temp (°K.) | NO Remaining (vppm) | $NH_3$ Remaining (vppm) |
|---|---|---|
| 1000 | 250 | 375 |
| 1050 | 250 | 375 |
| 1100 | 247 | 372 |
| 1150 | 210 | 338 |
| 1200 | 89 | 206 |
| 1250 | 54 | 122 |
| 1300 | 62 | 50 |
| 1350 | 101 | 7 |
| 1400 | 159 | 0 |
| 1450 | 227 | 0 |
| 1500 | 295 | 0 |

Table II also illustrates the limitations of the prior art. The NO reduction varies with temperature. For the specific conditions of this example the best reduction would occur near 1250° K., wherein only about 54 vppm NO remained. Unfortunately, this good reduction would be accompanied by the emission to the atmosphere of 122 vppm $NH_3$. While $NH_3$ emissions are much less of an environmental concern than NO emissions, they are still a concern.

Further, Table II shows that at 1300° K. NO may be reduced to 62 vppm with leftover $NH_3$ of 50 vppm. Thus it was within the scope of the prior art to minimize $NH_3$ emissions by sacrificing some of the possible NO reduction.

Now to illustrate the practice of the present invention we assume the same boiler and conditions as above. We also assume that the rate of cooling in a tube bank upstream of the 1250° K. cavity is between 4000° K./sec., and or 250° K./sec., these cooling rates covering the range of cooling rates normally used in commercial boilers. Further, we assume that the $NH_3$ injection system is not located in the 1250° K. cavity but at an upstream location where the flue gas temperature is either 1300° K., 1350° K., 1400° K., or 1500° K. Under these assumptions, the $NH_3$ would contact the NO containing flue gas while it was cooling toward a temperature of 1250° K. There would be a reaction time of however long it takes to cool to 1250° K. plus 0.1 seconds at 1250° K. Table III shows the results of such calculations.

TABLE III

| Initial Temp. °K. = | 1300 | | 1350 | | 1400 | | 1500 | |
|---|---|---|---|---|---|---|---|---|
| vppm of = | NO | $NH_3$ | NO | $NH_3$ | NO | $NH_3$ | NO | $NH_3$ |
| Cooling rate °K./sec | | | | | | | | |
| 4000 | 48 | 103 | 51 | 59 | 86 | 12 | 270 | 0 |
| 2000 | 45 | 87 | 56 | 29 | 118 | 1 | 283 | 0 |
| 1000 | 41 | 64 | 68 | 7 | 140 | 0 | 289 | 0 |
| 500 | 38 | 36 | 82 | 1 | 149 | 0 | 292 | 0 |
| 250 | 39 | 12 | 91 | 0 | 154 | 0 | 293 | 0 |

Comparison of Tables II and III reveals that injecting $NH_3$ into cooling flue gas in a tube bank at 1300° K. with a 250° K./sec cooling rate would provide more NO reduction than that achieved by isothermal injection at 1250° K. (reduction to 39 vppm as compared to 54 vppm) while causing considerably less $NH_3$ to be leftover (12 ppm as compared to 122 vppm). In fact, injection at 1300° K. with any cooling rate between 250° K./sec and 4000° K./sec provides better performance than isothermal injection.

In addition, one could inject $NH_3$ at 1350° K. and at relatively high cooling rates to obtain equivalent NO reduction to the prior art with appreciably less leftover $NH_3$. Thus, in this instance the subject invention provides an improvement over the prior art. The fact that this is a valuable improvement becomes clearer when one considers the trade off between NO reduction and $NH_3$ leftover. It was within the scope of the prior art to improve the reduction of NO by increasing the amount of $NH_3$ injected into the flue gas, this improvement being purchased at the expense of having more $NH_3$ leftover. The present invention adds more flexibility to this tradeoff and allows one to achieve much better NO reduction for a given amount of $NH_3$ leftover. Table IV shows the results of calculations similar to those in Table III but with the amount of $NH_3$ injected raised from 375 vppm to 750 vppm. Suppose, for the sake of an example comparing the present invention with the prior art, that one had a tube bank with a 500° K./sec cooling rate followed by a cavity at 1250° K. and wanted the best NO reduction possible with an $NH_3$ leftover of 122 vppm or less. The prior art for this situation would only produce an NO reduction down to 54 vppm. Table IV shows that if one doubles the amount of $NH_3$ injected, and injects at 1350° K., one achieves reduction of NO down to 23 vppm, a much better result. Further, this much better result is obtained with an $NH_3$ leftover of only 38 vppm. As can also be seen in Table IV, there are other combinations of injection temperature and cooling rate which also are an improvement over conventional techniques.

TABLE IV

| Initial Temp. °K. = | 1300 | | 1350 | | 1400 | | 1500 | |
|---|---|---|---|---|---|---|---|---|
| vppm of = | NO | $NH_3$ | NO | $NH_3$ | NO | $NH_3$ | NO | $NH_3$ |
| Cooling Rate °K./sec | | | | | | | | |
| 4000 | 17 | 403 | 16 | 324 | 21 | 165 | 271 | — |
| 2000 | 15 | 381 | 15 | 251 | 36 | 43 | 300 | — |
| 1000 | 13 | 345 | 17 | 149 | 78 | 1 | 314 | — |
| 500 | 12 | 291 | 23 | 38 | 104 | 0 | 320 | — |
| 250 | 12 | 210 | 41 | 1 | 115 | 0 | 323 | — |

The above examples illustrate the advantage of the present invention over the prior art in retorfitting the $deNO_x$ process to an existing installation. That is, one takes the installation, for example a boiler, as he finds it and as a consequence has no control of the temperature in the cavities between tube banks or the cooling rates within the tube banks. Thus, in the prior art, a cavity is chosen for $NH_3$ injection which is closest to optimum temperature. In accordance with the present invention, one may now install the $NH_3$ injection system within a tube bank since the optimum temperature for NO reduction may very well occur within a tube bank.

While the rate of cooling in the tube bank of an existing installation cannot be controlled, the position of $NH_3$ injection and the amount of $NH_3$ injected can be controlled. For example, it was illustrated in the above examples that at a cooling rate of 4000° K./sec there was one position for $NH_3$ injection and amount injected which gave optimum results. Of course, for cooling rates between 4000° K./sec and 250° K./sec, there would be intermediate values which would also give optimum results. Thus, it is a preferred embodiment of the present invention to adjust the position and the amount of $NH_3$ injected to match the cooling rate and thereby achieve optimum NO reductions.

Another limitation of the prior art which was previously discussed was the upper temperature limit of about 1375° K. Under prior art practice, this upper temperature limit was severe because, not only counld NO not be reduced at temperatures above about 1375° K., but additional NO production usually resulted.

Table V below illustrates additional calculations showing the extent to which the present invention alleviates the problems associated with the heretofore upper temperature limit for $NH_3$ injection. According to the prior art, an $NH_3$ injection temperature of 1500° K. would be inoperable. However, in accordance with the present invention, such an injection temperature is operable.

TABLE V

| | Initial NO = 250 vppm | | | | | |
|---|---|---|---|---|---|---|
| Initial Temperature, °K. | 1500 | 1500 | 1500 | 1600 | 1600 | 1600 |
| Initial $NH_3$, vppm | 1500 | 3000 | 3000 | 1500 | 3000 | 3000 |
| Cooling Rate, °K./sec | 10,000 | 4,000 | 10,000 | 10,000 | 4,000 | 10,000 |
| Final NO vppm | 18 | 12 | 8 | 632 | 778 | 608 |
| Final $NH_3$ vppm | 256 | 426 | 1658 | 0 | 0 | 0 |

The upper temperature limit at which NO reduction can be achieved is a function of reaction conditions. Table VI illustrates the effect of changes in $O_2$, $H_2O$, and NO upon the extent of NO production at very high temperatures. Combinations of these extreme conditions could allow NO reduction at temperatures even above those shown.

TABLE VI

Effect of Conditions on Upper Temperature Limit of NO Reduction

| Initial Temperature, °K. = | 1500 | | 1520 | | 1540 | | 1560 | | 1580 | | 1600 | |
|---|---|---|---|---|---|---|---|---|---|---|---|---|
| vppm of | NO | $NH_3$ | NO | $NH_3$ | NO | $NH_3$ | NO | $NH_3$ | NO | $NH_3$ | NO | $NH_3$ |
| Base Case: Initial gas composition = 250 ppm NO, 3000 ppm $NH_3$, 10.6% $H_2O$, 3.1% $O_2$, OH and O at thermodynamic equilibrium, 1.0 atm pressure, and a cooling rate of 10,000° K./sec to a final temperature of 1250° K. and 0.1 sec reaction time at 1250° K. | 8 | 1660 | 8 | 1232 | 11 | 652 | 58 | 49 | 374 | 0 | 608 | 0 |
| Case 1: Same as Base Case except $O_2$ decreased to 1% | 5 | 2000 | 5 | 1688 | 5 | 1242 | 8 | 588 | 121 | 5 | 608 | 0 |
| Case 2: Same as Base Case except $H_2O$ increased to 30% | 11 | 1936 | 13 | 1582 | 17 | 1114 | 38 | 538 | 181 | 70 | 537 | 0 |
| Case 3: Same as Base Case except NO increased to 2000 ppm | 236 | 3 | 441 | 0 | 629 | 0 | 812 | 0 | 994 | 0 | 1183 | 0 |

While the above discussion relates to the application of the present invention in retrofit situations, it obviously may also be applied to the reduction of NO in new stationary combustion equipment. Suppose, for the purpose of discussion, that one is building a new boiler of some kind and wishes to achieve the best NO reduction possible within the design constraints of that kind of boiler. Specifically, we can assume that the boiler is intended to operate at very high flue gas velocity so that the time available for NO reduction is only 0.02 seconds. Given this short reaction time the best possible NO reduction consistent with acceptable $NH_3$ leftover is desired. To take an arbitrary but convenient value, we assume that the leftover $NH_3$ must be less than 159 vppm.

Table VII shows calculations of what could be achieved by the prior art in this situation. It is evident that the best one can do within the limitations of the prior art is to operate near 1350° K., this giving one an NO reduction from 250 vppm to near 141 vppm. Of course this calculation is done assuming an $NH_3$ injection of 375 ppm and increasing the $NH_3$ injection would improve NO reduction. However it would also increase $NH_3$ leftover and $NH_3$ leftover is already at the maximum permissible value. This reduction to 141 vppm is the best the prior art can achieve.

TABLE VII

Comparative Examples of NO reduction at Isothermal Conditions
Initial conditions NO = 250 vppm, $NH_3$ = 375 vppm, $H_2O$ = 10.6%, $O_2$ = 3.1%, OH and O equal their equilibrium values and the balance of the flue gas is inert. Pressure = 1.0 atmospheres, Reaction Time = 0.02 seconds.

| Temp (°K.) | NO Remaining, vppm | $NH_3$ Remaining, vppm |
|---|---|---|
| 1000 | 250 | 375 |
| 1050 | 250 | 375 |
| 1100 | 250 | 375 |
| 1150 | 238 | 364 |
| 1200 | 209 | 334 |
| 1250 | 164 | 227 |
| 1300 | 142 | 226 |
| 1350 | 141 | 159 |
| 1400 | 169 | 83 |
| 1450 | 227 | 20 |

TABLE VII-continued

Comparative Examples of NO reduction at Isothermal Conditions
Initial conditions NO = 250 vppm, $NH_3$ = 375 vppm, $H_2O$ = 10.6%, $O_2$ = 3.1%, OH and O equal their equilibrium values and the balance of the flue gas is inert. Pressure = 1.0 atmospheres, Reaction Time = 0.02 seconds.

| Temp (°K.) | NO Remaining, vppm | $NH_3$ Remaining, vppm |
|---|---|---|
| 1500 | 295 | 2 |

The present invention would show an improvement over the prior art. In Table VIII below, results are given for calculations in which it was assumed that 750 vppm $NH_3$ was injected at 1400° K. in a flue gas at various cooling rates with a final temperature of 1300° K. For a cooling rate of 2000° K./sec. Table VIII shows that a reduction of NO to 59 vppm (as compared with 141 vppm for the prior art) may be achieved with only 93 vppm $NH_3$ leftover (as compared with 159 vppm for the prior art). Thus, the practice of the present invention could achieve both better NO reduction as well as less $NH_3$ leftover.

TABLE VIII

Example of subject invention: Initial conditions NO = 250 vppm, NH = 750 vppm, $H_2O$ = 10.6% O = 3.1%, OH and O equal their equilibrium values and the balance of the flue gas is inert. Pressure = 1.0 atmospheres, Reaction Time = 0.02 seconds at 1300° K., Initial Temperature = 1400° K.

| Cooling Rate | NO Remaining, vppm | $NH_3$ Remaining, vppm |
|---|---|---|
| 4000° K./sec | 54 | 232 |
| 2000° K./sec | 59 | 93 |
| 1000° K./sec | 82 | 9 |
| 500° K./sec | 104 | 0 |
| 250° K./sec | 115 | 0 |

What is claimed is:

1. A process for reducing NO concentration of a combustion effluent containing NO and at least 0.1 volume percent oxygen when at least a portion of the combustion effluent is at a temperature within the range of about 1300° K. to about 1600° K. which process comprises injecting ammonia into the combustion effluent, in a cooling zone wherein the combustion effluent is cooling at a rate of at least about 250° K. per second wherein the amount of ammonia and the point of injection are determined by the solution of a set of simultaneous equations derived from the kinetic model:

| Rate constant K = $AT^n \exp(-E/(1.98)T)$ | | | |
|---|---|---|---|
| REACTION | A | n | E |
| $NH_3+O=NH_2+H_2$ | .246E+14 | 0.0 | 17071. |
| $NH_3+O=NH_2+OH$ | .150E+13 | 0.0 | 6040. |
| $NH_3+OH=NH_2+H_2O$ | .326E+13 | 0.0 | 2120. |
| $HNO+M=NO+H+M$ | .186E+17 | 0.0 | 48680. |
| $HNO+OH=NO+H_2O$ | .360E+14 | 0.0 | 0. |
| $NH_2+HNO=NH_3+NO$ | .175E+15 | 0.0 | 1000. |
| $NH_2+NO=NNH+OH$ | .610E+20 | −2.46 | 1866. |
| $NH_2+O_2=HNO+OH$ | .510E+14 | 0.0 | 30000. |
| $NNH+NH_2=N_2+NH_3$ | .100E+14 | 0.0 | 0. |
| $NH_2+O=NH+OH$ | .170E+14 | 0.0 | 1000. |
| $NH_2+OH=NH+H_2O$ | .549E+11 | 0.68 | 1290. |
| $NH_2+H=NH+H_2$ | .500E+12 | 0.5 | 2000. |
| $NH+O_2=NHO+O$ | .300E+14 | 0.0 | 3400. |
| $H_2+OH=H_2O+H$ | .220E+14 | 0.0 | 5150. |
| $H+O_2=OH+O$ | .220E+15 | 0.0 | 16800. |
| $O+H_2=OH+H$ | .180E+11 | 1.0 | 8900. |
| $H+HO_2=OH+OH$ | .250E+15 | 0.0 | 1900. |
| $O+HO_2=O_2+OH$ | .480E+15 | 0.0 | 1000. |
| $OH+HO_2=H_2O+O_2$ | .500E+14 | 0.0 | 1000. |
| $OH+OH=O+H_2O$ | .630E+13 | 0.0 | 1090. |
| $HO_2+NO=NO_2+OH$ | .343E+13 | 0.0 | −260. |
| $H+NO_2=NO+OH$ | .350E+15 | 0.0 | 1500. |
| $O+NO_2=NO+O_2$ | .100E+14 | 0.0 | 600. |
| $H+O_2+M=HO_2+M$ $H_2O/21$** | .150E+16 | 0.0 | −995. |
| $NNH+M=N_2+H+M$ | .200E+15 | 0.0 | 30000. |
| $NO_2+M=NO+O+M$ | .110E+17 | 0.0 | 66000. |
| $NH_3+M=NH_2+H+M$ | .480E+17 | 0.0 | 93929. |
| $O+O+M=O_2+M$ | .138E+19 | −1.0 | 340. |
| $NH_2+NO=N_2+H_2O$ | .910E+20 | −2.46 | 1866. |
| $NNH+OH=N_2+H_2O$ | .300E+14 | 0.0 | 0. |
| $NNH+NO=N_2+HNO$ | .906E+12 | 0.0 | 0. |

**i.e. A=21 × .15E+16 for $H_2O$ as "third body".

2. The process of claim 1 wherein about 0.4 to 10 moles of ammonia is injected per mole of NO of the combustion effluent.

3. The process of claim 2 wherein about 1 to 3 moles of ammonia is injected per mole of NO of the combustion effluent.

4. The process of claim 2 wherein the cooling zone in which the ammonia is injected is cooling at a rate of at least about 1000° K./sec.

5. The process of claim 4 wherein at least 0.25 volume percent of oxygen is present in the combustion effluent.

6. In a process for reducing NO concentration of at combustion effluent containing NO and at least 0.1 volume percent oxygen when at least a portion of the combustion effluent is at a temperature within the range of about 1300° K. to 1600° K. and wherein the combustion effluent passes through at least one cooling zone in which it is cooling at a rate of at least about 250° K. per second, the improvement which comprises injecting enough ammonia into the combustion effluent at a point upstream from a cooling zone having a cooling rate of at least about 250° K. where the temperature of the combustion effluents is from about 1300° K. to 1600° K. such that when the combustion effluent reaches said cooling zone it contains at least 0.4 moles of ammonia per mole of NO.

7. The process of claim 6 wherein the combustion effluent contains from about 1 to 3 moles of ammonia per mole of NO when it reaches the cooling zone.

8. The process of claim 6 wherein at least 0.25 volume percent of oxygen is present in the combustion effluent.

9. The process of claim 6 wherein the ammonia is injected within 10.4 seconds upstream from the cooling zone.

* * * * *